US012647988B2

(12) United States Patent
Ryu et al.

(10) Patent No.: US 12,647,988 B2
(45) Date of Patent: Jun. 2, 2026

(54) SIDELINK MINI-SLOT OPERATION IN MODES 1 AND 2

(71) Applicant: QUALCOMM Incorporated, San Diego, CA (US)

(72) Inventors: Jung Ho Ryu, Fort Lee, NJ (US); Sony Akkarakaran, Poway, CA (US); Xiaojie Wang, Hillsborough, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 824 days.

(21) Appl. No.: 17/647,720

(22) Filed: Jan. 11, 2022

(65) Prior Publication Data

US 2023/0224910 A1 Jul. 13, 2023

(51) Int. Cl.
| | |
|---|---|
| *H04W 72/02* | (2009.01) |
| *H04W 72/20* | (2023.01) |
| *H04W 72/23* | (2023.01) |

(52) U.S. Cl.
CPC ........... *H04W 72/23* (2023.01); *H04W 72/02* (2013.01); *H04W 72/20* (2023.01)

(58) Field of Classification Search
CPC ..... H04W 72/20; H04W 72/02; H04W 76/14; H04W 72/23; H04W 52/26; H04W 52/146; H04W 92/18; H04W 52/346; H04W 52/242; H04W 52/241; H04L 1/0029; H04B 17/327
See application file for complete search history.

(56) References Cited

U.S. PATENT DOCUMENTS

| | | | |
|---|---|---|---|
| 2019/0379516 A1 | 12/2019 | Horiuchi et al. | |
| 2020/0077391 A1* | 3/2020 | Choi ................. | H04W 72/0446 |
| 2021/0028891 A1 | 1/2021 | Zhou et al. | |
| 2021/0112505 A1 | 4/2021 | Li et al. | |
| 2021/0168763 A1* | 6/2021 | Cheng ................... | H04W 72/20 |
| 2021/0219268 A1 | 7/2021 | Li et al. | |
| 2021/0266951 A1* | 8/2021 | Gulati ................. | H04B 17/318 |
| 2021/0329633 A1* | 10/2021 | Xing ................. | H04W 72/0446 |

FOREIGN PATENT DOCUMENTS

WO 2021263257 A1 12/2021

OTHER PUBLICATIONS

CATT: "Sidelink Physical Layer Structure in NR V2X", 3GPP TSG RAN WG1 Meeting #97, R1-1906314, 3rd Generation Partnership Project, Mobile Competence Centre, 650, Route Des Lucioles, F-06921 Sophia-Antipolis Cedex, France, vol. RAN WG1, No. Reno, USA, May 13, 2019-May 17, 2019, May 13, 2019, XP051727764, 15 pages, Section 2, p. 2-p. 3, figure 1.
International Search Report and Written Opinion—PCT/US2023/ 060276—ISA/EPO—Apr. 11, 2023.

(Continued)

*Primary Examiner* — Anez C Ebrahim
(74) *Attorney, Agent, or Firm* — Dinsmore & Shohl LLP

(57) ABSTRACT

Certain aspects of the present disclosure provide techniques for mini-slot operation in sidelink communications. A method performed by a user equipment (UE) includes determining a mini-slot within a configured sidelink slot in which to perform sidelink transmission, and performing the sidelink transmission in the mini-slot.

16 Claims, 11 Drawing Sheets

(56) References Cited

OTHER PUBLICATIONS

Vivo: "Discussion on Mode 1 Resource Allocation Mechanism", 3GPP TSG RAN WG1 #97, R1-1906138, 3rd Generation Partnership Project, Mobile Competence Centre, 650, Route Des Lucioles, F-06921 Sophia-Antipolis Cedex, vol. RAN WG1, No. Reno, USA, May 13, 2019-May 17, 2019, May 13, 2019, XP051727594, 13 pages, section 2.2, p. 2-p. 3, section 2.4, p. 5.

* cited by examiner 5 symbol PSSCH with UL 12 symbol PSSCH 5 symbol PSSCH with PSFCH and UL

600

620

800

A method of wireless communication by a user equipment

Determine a mini-slot within a configured sidelink slot in which to perform sidelink transmission

805

Perform the sidelink transmission in the mini-slot

810

900

A method of wireless communication by a base station

Transmit a sidelink transmission grant to a user equipment including a set of sidelink transmission configuration parameters, where the set of sidelink transmission configuration parameters defines a set of mini-slots within a configured sidelink slot

905

SIDELINK MINI-SLOT OPERATION IN MODES 1 AND 2

INTRODUCTION

Aspects of the present disclosure relate to wireless communications, and more particularly, to techniques for mini-slot operation in sidelink communications.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

One aspect provides a method of wireless communication by a user equipment (UE), including determining a mini-slot within a configured sidelink slot in which to perform sidelink transmission; and performing the sidelink transmission in the mini-slot.

Another aspect provides a method of wireless communication by a base station, including transmitting a sidelink transmission grant to a user equipment comprising a set of sidelink transmission configuration parameters, wherein the set of sidelink transmission configuration parameters defines a plurality of mini-slots within a configured sidelink slot.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

DETAILED DESCRIPTION

Aspects of the present disclosure provide apparatuses, methods, processing systems, and computer-readable mediums for mini-slot operation in sidelink communications.

Sidelink communications generally refer to direct communications between devices, such as user equipments. Sidelink communications beneficially allow for communication between such devices without traversing network resources (e.g., base stations), though a network may nevertheless be involved with configuring the sidelink resources so that simultaneous network and sidelink communications coexist.

Sidelink communications may operate in various modes. For example, in a first mode (Mode 1), a base station indicates to a user equipment which resources to use to make a transmission. As another example, in a second mode (Mode 2), the user equipment is able to choose which resources to use to make a transmission based on channel sensing.

Generally, sidelink communications structures mimic those used in non-sidelink communications with a network, such as slot-based allocation of time and frequency resources to determine when a device can transmit and/or receive data. Conventionally, slots comprise a fixed number of symbols, such as 14 orthogonal frequency-division multiplexing (OFDM) symbols in one example. However, it may be desirable to enable additional communication structures for sidelink communications, such as mini-slots (e.g., intra-slot structures). Utilization of mini-slot structures for sidelink communications increase resource utilization in sidelink communications by allowing for smaller and more frequent allocations of resources beyond the traditional minimum resource allocation unit of a slot. In order to maximize utilization of mini-slots in sidelink communications, it is beneficial to configure their operation for different modes of sidelink operations.

Aspects described herein provide techniques for configuring and performing mini-slot-based sidelink communications in multiple sidelink operating modes, including Mode 1 and Mode 2 as described above. Beneficially, by enabling sidelink communications in multiple modes of sidelink communications, communication latency decreases and resource utilization increases. Relatedly, devices performing sidelink communications with mini-slots may reduce power consumption and processing loads for both transmission and reception of data. Networks enabling sidelink communications with mini-slots may beneficially experience reduced congestion, higher data throughput, and better utilization and efficiency.

Introduction to Wireless Communication Networks

Figure 1:
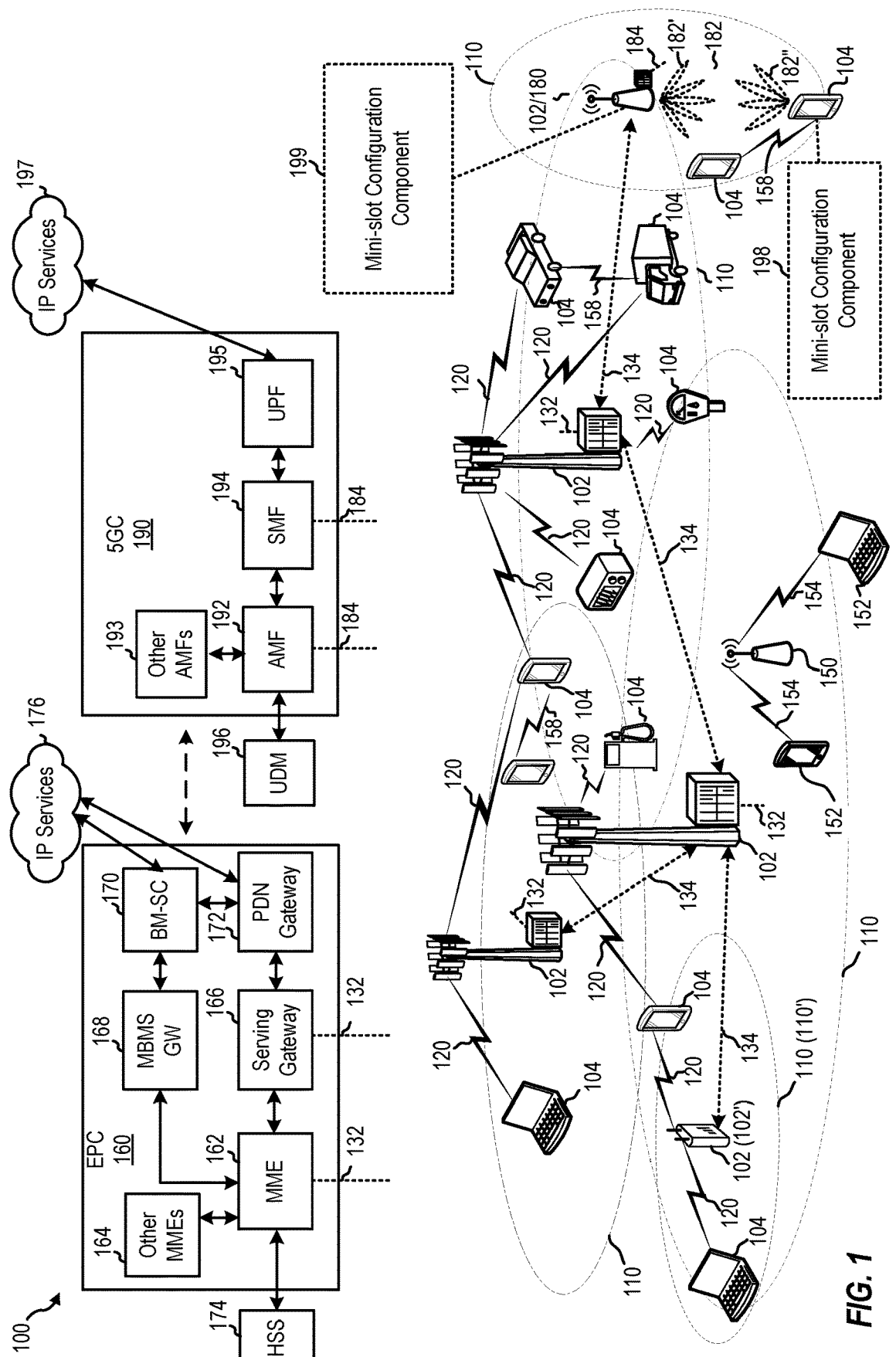
FIG. 1 is a block diagram conceptually illustrating an example wireless communication network.

FIG. 1 depicts an example of a wireless communication network 100, in which aspects described herein may be implemented.

Generally, wireless communication network 100 includes base stations (BSs) 102, user equipments (UEs) 104, one or more core networks, such as an Evolved Packet Core (EPC) 160 and 5G Core (5GC) network 190, which interoperate to provide wireless communications services.

BSs 102 may provide an access point to the EPC 160 and/or 5GC 190 for a UE 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

A base station, such as BS 102, may include components that are located at a single physical location or components located at various physical locations. In examples in which the base station includes components that are located at various physical locations, the various components may each perform various functions such that, collectively, the various components achieve functionality that is similar to a base station that is located at a single physical location. As such, a base station may equivalently refer to a standalone base station or a base station including components that are located at various physical locations or virtualized locations. In some implementations, a base station including components that are located at various physical locations may be referred to as or may be associated with a disaggregated radio access network (RAN) architecture, such as an Open RAN (O-RAN) or Virtualized RAN (VRAN) architecture. In some implementations, such components of a base station may include or refer to one or more of a central unit (CU), a distributed unit (DU), or a radio unit (RU).

BSs 102 wirelessly communicate with UEs 104 via communications links 120. Each of BSs 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Figure 9:
FIG. 9 depicts another example of a process for wireless communication according to aspects of the present disclosure.

Wireless communication network 100 includes mini-slot configuration component 199, which may be configured to configure mini-slots for various network entities, including user equipments 104. Wireless network 100 further includes mini-slot configuration component 198, which may be used configured to perform operations for configuring mini-slots for sidelink communications, such as illustrated in FIG. 9.

Figure 2:
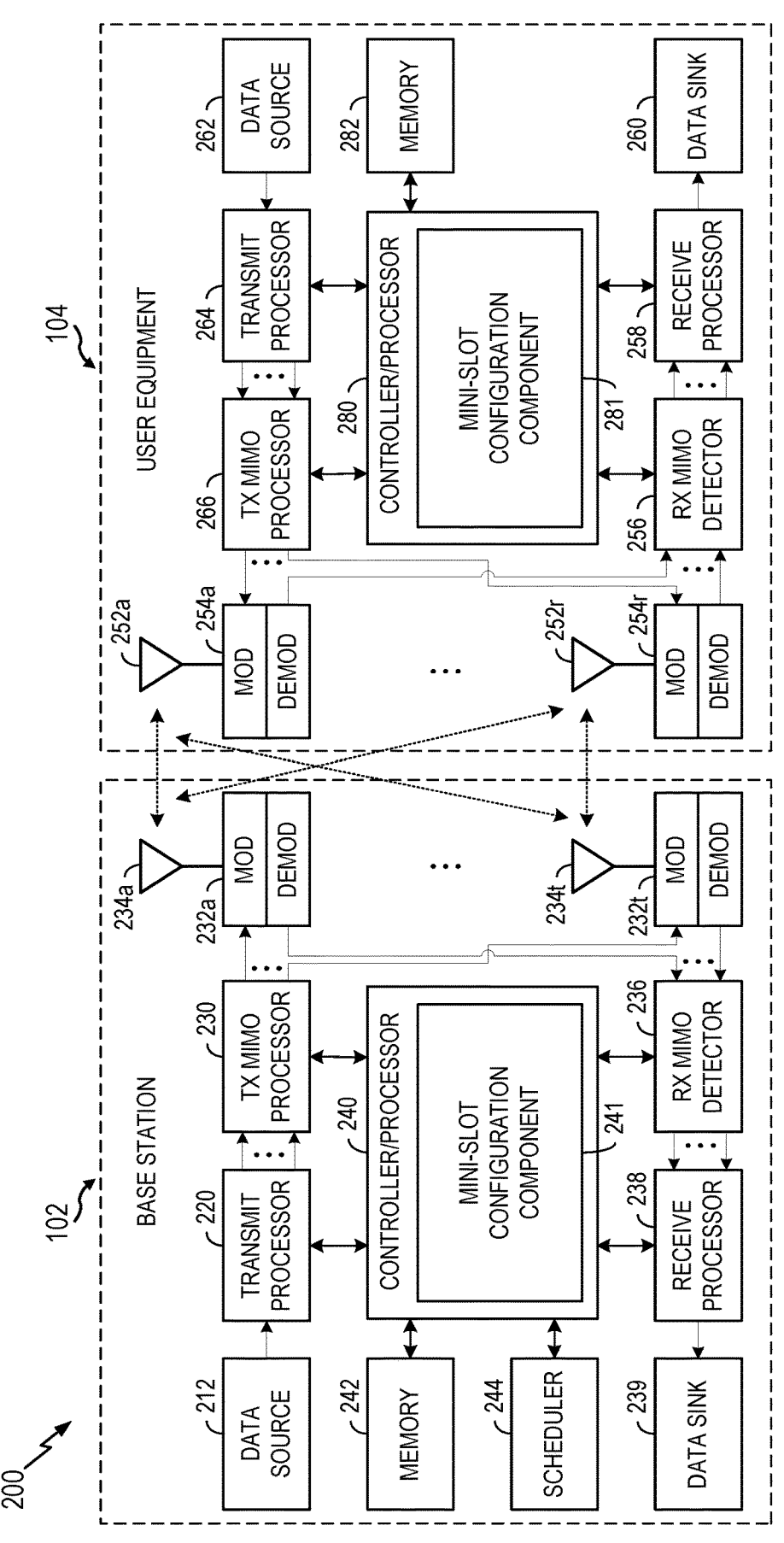
FIG. 2 is a block diagram conceptually illustrating aspects of an example of a base station and user equipment.

FIG. 2 depicts aspects of an example BS 102 and a UE 104. Generally, BS 102 includes various processors (e.g., 220, 230, 238, and 240), antennas 234*a*-t (collectively 234), transceivers 232*a*-t (collectively 232), which include modulators and demodulators, and other aspects, which enable wireless transmission of data (e.g., data source 212) and wireless reception of data (e.g., data sink 239). For example, BS 102 may send and receive data between itself and UE 104.

BS 102 includes controller/processor 240, which may be configured to implement various functions related to wireless communications. In the depicted example, controller/processor 240 includes mini-slot configuration component 241, which may be representative of mini-slot configuration component 199 of FIG. 1. Notably, while depicted as an aspect of controller/processor 240, mini-slot configuration component 241 may be implemented additionally or alternatively in various other aspects of BS 102 in other implementations.

Generally, UE 104 includes various processors (e.g., 258, 264, 266, and 280), antennas 252*a*-r (collectively 252), transceivers 254*a*-r (collectively 254), which include modulators and demodulators, and other aspects, which enable wireless transmission of data (e.g., data source 262) and wireless reception of data (e.g., data sink 260).

UE 104 includes controller/processor 280, which may be configured to implement various functions related to wireless communications. In the depicted example, controller/processor 280 includes mini-slot confgiuration component 281, which may be representative of mini-slot configuration component 198 of FIG. 1. Notably, while depicted as an aspect of controller/processor 280, mini-slot configuration component 281 may be implemented additionally or alternatively in various other aspects of UE 104 in other implementations.

Figures 3A, 3B, 3C, 3D:
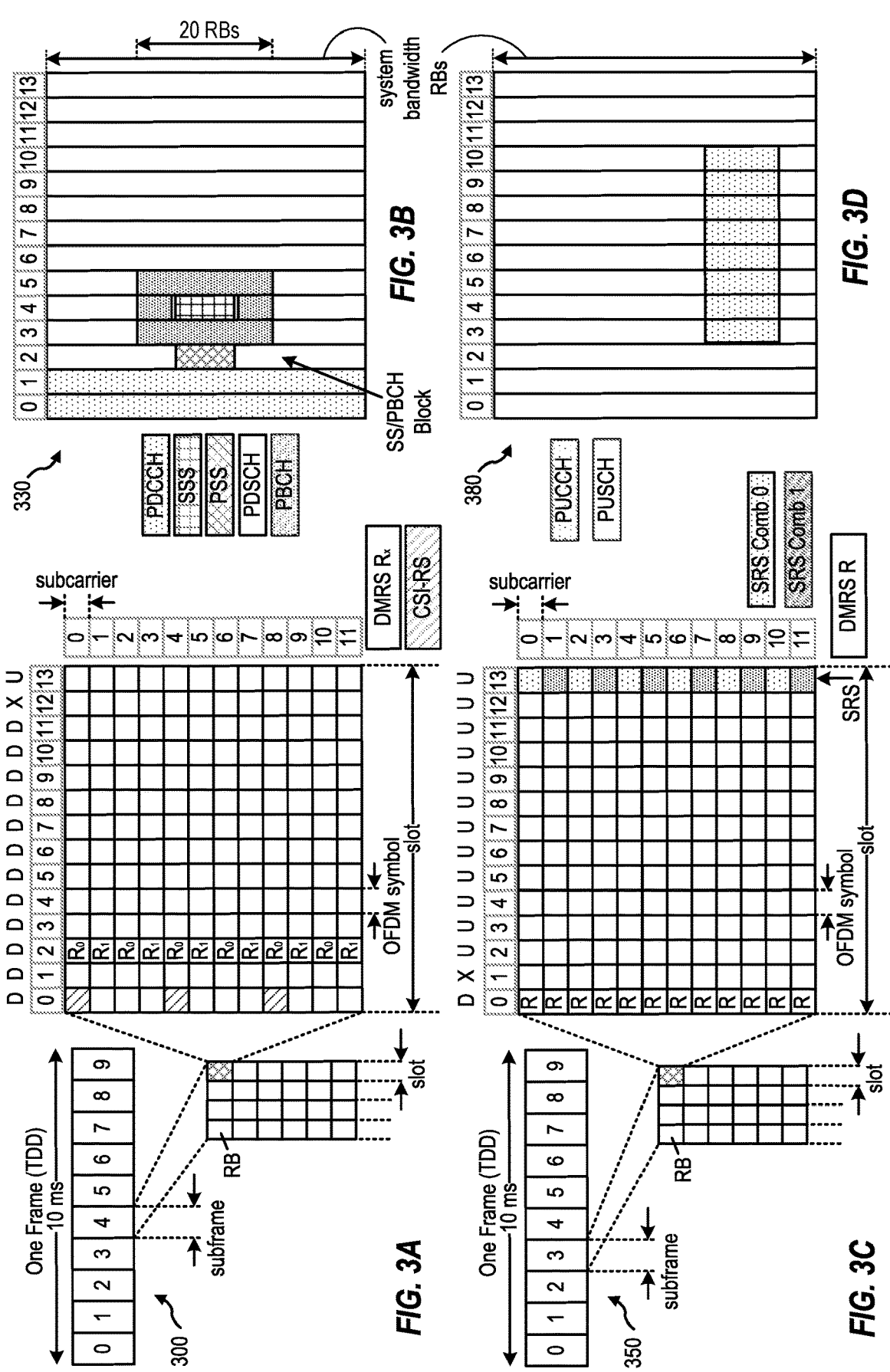
FIGS. 3A, 3B, 3C, and 3D depict various example aspects of data structures for a wireless communication network.

FIGS. 3A, 3B, 3C, and 3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A, 3B, 3C, and 3D are provided later in this disclosure.

Introduction to Sidelink Slot Structure

As noted above, sidelink communications generally refer to direct communications between devices, such as user equipment to user equipment communications. Generally, sidelink communications may use communication structures, like slots, for these direct communications, which may comprise a configurable number of data symbols. For example, a typical slot may comprises 12 or 14 OFDM symbols, which may include, for example, downlink symbols, uplink symbols, flexible symbols, and other types. Generally, a slot is marked for sidelink communications if it contains OFDM symbols that are configured for sidelink communications.

Sidelink slots are defined by at least two parameters. First, a symbol start parameter is the symbol index of the first sidelink symbol of the sidelink slot. In other words, the symbol start parameter indicates where in the slot the sidelink portion starts. For example, a symbol start parameter may be a parameter such as sl-StartSymbol. Next, a symbol length parameter indicates the length of the sidelink slot in symbols. For example, a symbol length parameter may be sl-LengthSymbols. In some cases, these parameters may be configured per sidelink bandwidth part (BWP).

Sidelink slots may have specific structure (or format) characteristics, such as always beginning with a symbol configured for automatic gain control (AGC). In such formats, symbols for physical sidelink shared channel (PSSCH) communications may begin in the second symbol of the slot and can be, for example, five to twelve symbols long. Further, a physical sidelink control channel (PSCCH) may be frequency duplexed with PSSCH in symbols, generally starting from second sidelink symbol in the slot, and is generally two or three symbols long. Remaining symbols in a sidelink slot are generally either gap symbols, physical sidelink feedback channel (PSFCH) symbols, downlink symbols, and/or uplink symbols, though other symbols are possible. These are just some examples, and other configurations are possible.

Figure 4:
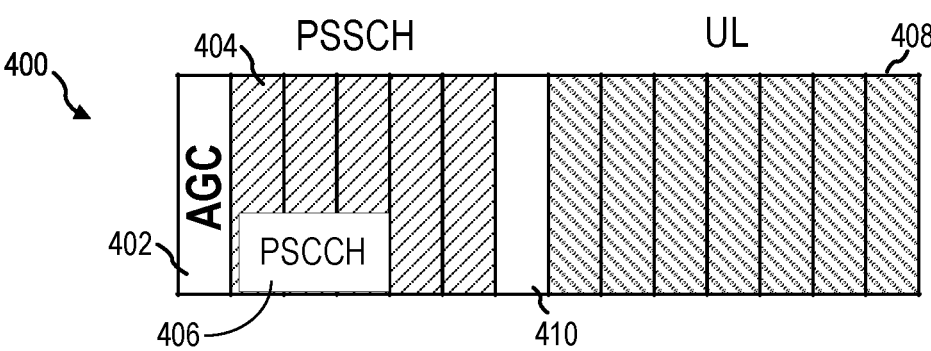
FIG. 4 depicts an example of sidelink slot structures.
Figure 4:
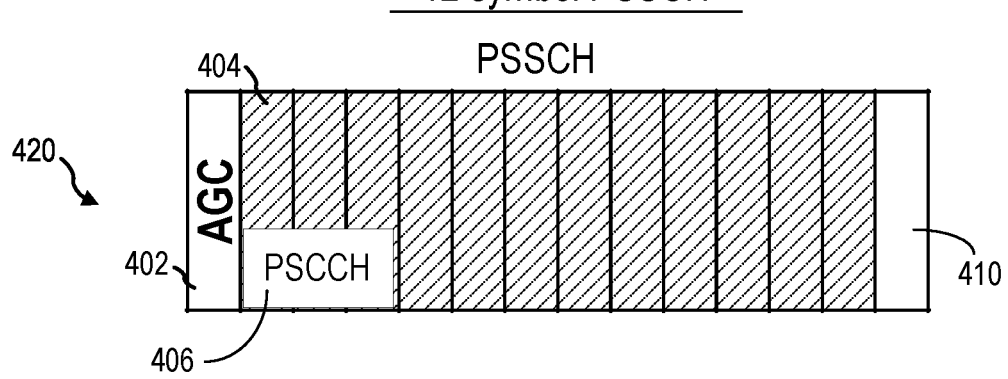
Figure 4:
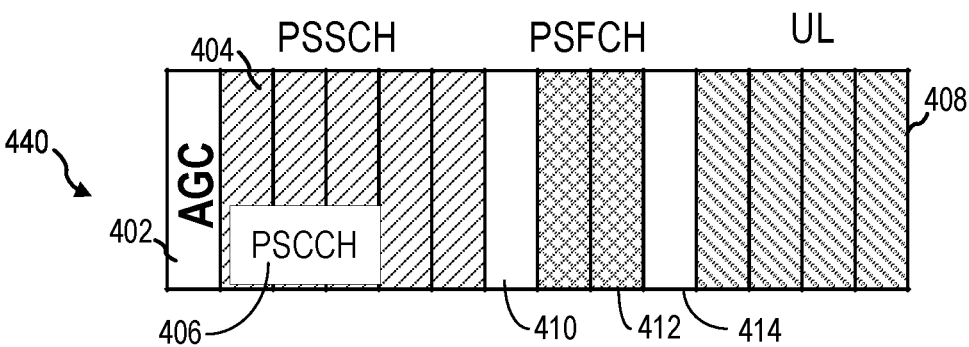

FIG. 4 depicts various example sidelink slot formats. The first example sidelink slot structure 400 comprises 14 OFDM symbols. The first symbol in slot structure 400 is a symbol designated for use for AGC by a receiver, and thus may be referred to as an "AGC symbol" 402. Slot structure 400 further includes five PSSCH symbols 404 corresponding to a sidelink data portion of the sidelink slot structure 400. Generally, the PSSCH can be 5 to 12 symbols long, based on the sidelink symbol length parameter. Slot structure 400 further includes PSCCH symbols 406, which in this example is 3 symbols long starting at the second sidelink symbol and corresponding to a control portion of the sidelink slot structure 400. Generally, the PSCCH symbols 406 are 2 or 3 symbols in length and are frequency duplexed with the PSSCH symbols. In the first example sidelink slot structure 400, the PSCCH symbols 404 are followed by a gap symbol 410. The gap symbol allows the user equipment to switch beams or switch from receiving to transmitting. The final OFDM symbols of sidelink slot structure 400 are dedicated to uplink symbols 408 (e.g., uplink to a network). In this example, sidelink slot structure 400, there are 6 total sidelink symbols, 1 gap symbol, and 7 uplink symbols 408.

The second example sidelink slot structure 420 also comprises 14 OFDM symbols. Similar to the first example sidelink slot structure 400, the first symbol 402 is used for AGC. The next 12 symbols are PSSCH symbols 404. Similar to the first example sidelink slot structure 400, sidelink structure 420 includes 3 PSCCH symbols 406 frequency duplexed with the PSSCH symbols starting at the second slot symbol. The PSSCH symbols 404 are followed by a gap symbol 410.

The third example sidelink slot structure 440 also comprises 14 OFDM symbols. Similar to the first example sidelink slot structure 400, the first symbol 402 is used for AGC. The next 5 symbols are PSSCH symbols 404, which include 3 frequency duplexed PSCCH symbols starting at the second sidelink symbol. The PSSCH symbols 404 are followed by gap symbol 410. Starting at the eighth symbol, there are two PSFCH symbols 412 followed by another gap symbol 414. Lastly, sidelink slot structure 440 includes 4 uplink symbols 408.

Note that the example sidelink slot structures 400, 420, and 440 are just a few examples, and many other structures (or formats) are possible.

In some cases, when transmitting and/or receiving using conventional sidelink slot structures, not all fourteen OFDM symbols are used, which means the unallocated portions of the slot go unused, leading to lower spectrum efficiency in the communication system. In order to improve efficiency, and to enable new communication modes, aspects described herein relate to sidelink mini-slots, which are intra-slot communication structures. Mini-slots are beneficial for transmitting and receiving small amounts of data within a slot without requiring a reservation of an entire slot structure.

Aspects Related to Enabling Mini-Slot in Sidelink Communications

Figure 5:
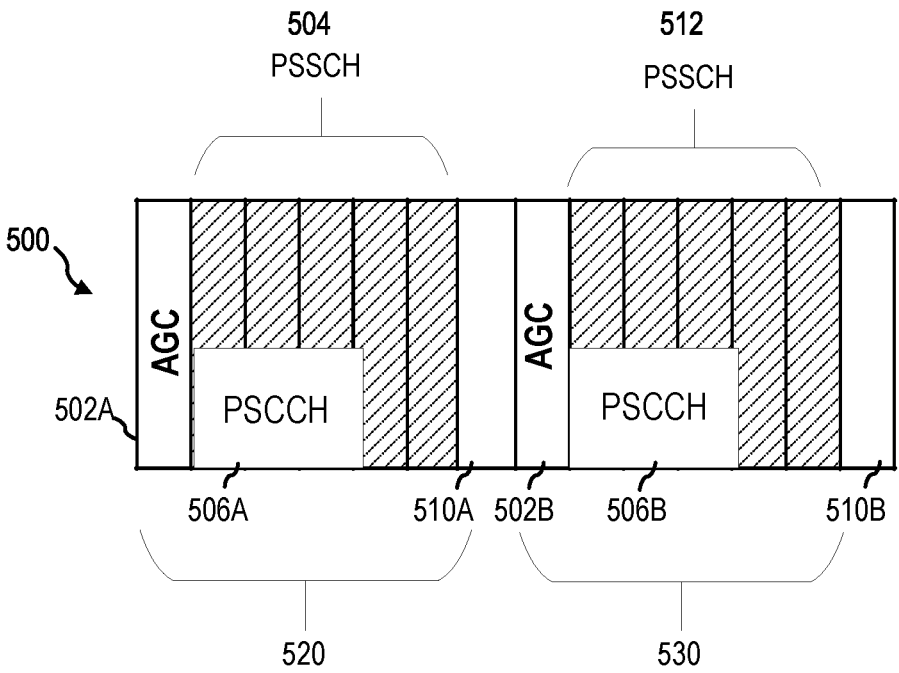
FIG. 5 depicts an example of sidelink mini-slot structures within a conventional slot structure, according to aspects of the present disclosure.

FIG. 5 depicts an example of sidelink mini-slot structures within a conventional sidelink slot structure 500, according to aspects of the present disclosure.

In the depicted example, sidelink slot structure 500 includes 2 mini-slots, 520 and 530. Similar to the other sidelink slot structures discussed above with reference to FIG. 4, each mini-slot (520 and 530) includes a symbol (502A and 502B) for use in AGC, which allows receiving user equipment to accurately set, for example, a gain.

In this sidelink slot structure 500, the first mini-slot 520 is 7 OFDM symbols in length. The first mini-slot 520 comprises five PSSCH symbols 504 and three PSCCH symbols 506A. The PSSCH symbols 504 are followed by a gap symbol 510A. The second mini-slot 530 is similarly 7 OFDM symbols in length and generally has the same arrangement as mini-slot 520, including PSSCH symbols 512, PSCCH symbols 506B, and gap symbol 510B.

Similar to conventional sidelink slot structures, here the entire sidelink slot structure 500 is 14 OFDM symbols in length. However, mini-slots 520 and 530 allow for sending and/or receiving compact data transmissions to multiple recipients and/or senders within a single slot structure. Conventionally, a small data transmission in a full slot structure would have left the remaining slot underutilized, but with mini-slots, slot utilization may be increased, thus leading to greater utilization of the spectrum, while beneficially reducing communication latency.

Aspects Related to Mode 1 and Mode 2 Operation in Sidelink Communications

Sidelink communications may be performed in various modes. For example, in Mode 1 operation, a base station indicates to a sidelink user equipment which resources to use to make a sidelink transmission. In Mode 2 operation, a sidelink user equipment identifies resources for the sidelink transmissions on its own, for example, based on channel sensing.

In Mode 1 operation, the resources that the sidelink user equipment can use to transmit may be configured in a downlink control message, such as a DCI 3_0 message. The downlink control message includes a time resource assignment, which indicates which slot the sidelink transmit user equipment can use to transmit. The time resource assignment may indicate up to three sidelink slots, the first of which is an initial transmission, and the second and third of which are retransmissions. The downlink control message also includes a frequency resource assignment, which indicates where in the frequency spectrum the sidelink user equipment can make the transmission.

In addition to a downlink control message, sidelink control information (SCI) may also contain a time resource assignment. The SCI time resource assignment may be used by a sidelink user equipment to indicate to another sidelink user equipment (e.g., a receiving sidelink user equipment) which slot it will use to make the sidelink transmission.

In Mode 2 operation, as noted above, the transmitting sidelink user equipment determines which resources it will use for the sidelink transmission. Once the transmitting sidelink user equipment determines which resources to use, it will include that information in the time resource assignment of the SCI to tell the receiving sidelink user equipment in which slots to expect to receive transmissions.

In addition to the time resource assignment, the SCI also contains a resource reservation period. The resource reservation period can be used to reserve multiple slots at configurable periodicities. The reserved slots are for new, future transmissions.

It is beneficial to differentiate between different sidelink modes of operation when configuring mini-slots for use, and especially considering future resource reservations while using mini-slots. Accordingly, aspects of the present disclosure enable configuration and use of mini-slots in Mode 1 and Mode 2 sidelink operations.

Aspects Related to Mini-slot Operation in Sidelink Communications

Figure 6:
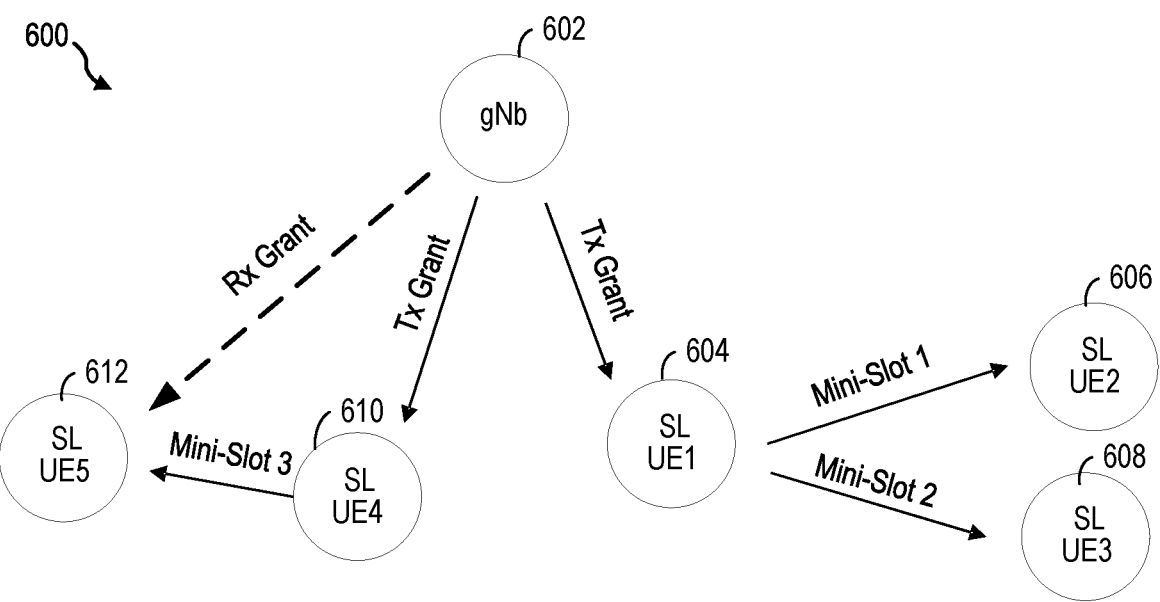
FIG. 6 depicts an example network diagram and corresponding sidelink mini-slot structures for sidelink communications in Mode 1, according to aspects of the present disclosure.
Figure 6:
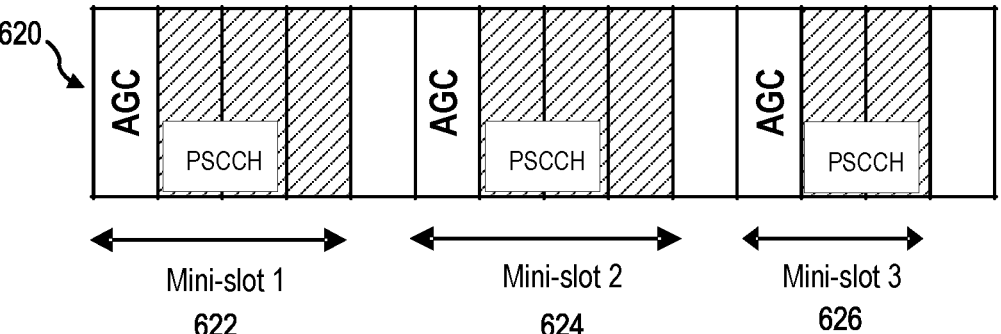

FIG. 6 depicts an example network diagram 600 and corresponding sidelink mini-slot structures 620 for sidelink communications in Mode 1, according to aspects of the present disclosure. As noted above, in Mode 1 operation, a transmit (Tx) grant from a base station indicates which slot or slots a transmitting user equipment can use for a sidelink transmission. This may be configured in multiple ways.

In a first option, the transmitting user equipment can use any pre-configured mini-slots specified in the Tx grant from the base station. In other words, the Tx grant specifies only which slot to use, but not which mini-slots within the slot to use. This allows the transmitting user equipment to determine which mini-slot to use for the transmission. In this option, mini-slots can be transmitted to multiple receiving user equipments. For example, the transmitting user equipment could use a first mini-slot to transmit to a first receiving user equipment and a second mini-slot to transmit to a second receiving user equipment. An example of this option is depicted in FIG. 6, where sidelink user equipment 1 (SL UE1) 604 is transmitting a first mini-slot 622 to sidelink user equipment 2 (SL UE2) 608 and a second mini-slot 624 to sidelink user equipment 3 (SL UE3) 608.

In a second option, the Tx grant specifies one or more specific mini-slots the transmitting user equipment can use for the sidelink transmission. In this option, the transmit user equipment does not have independent choice regarding which mini-slot to use for the transmission. Additionally, in the second option, the base station may transmit a receive (Rx) grant that also specifies the mini-slot in which a receiving user equipment should receive the transmission. An example of this option is depicted in FIG. 6, where the base station 602 indicates to sidelink user equipment 4 (SL UE4) 610 to transmit a third mini-slot 626 to sidelink user equipment 5 (SL UE5) 612.

In some aspects, the receiving user equipments may generally monitor for SCI in order to determine when mini-slot transmissions will happen. Alternatively, the transmitting user equipment can configure the receiving user equipment with one or more mini-slots to monitor for receiving transmissions under either the first or second option above. In other aspects, the base station (e.g., 602)

can configure the receiving user equipment with one or more mini-slots to monitor for receiving transmissions under the second option described above.

Figures 7A, 7B:
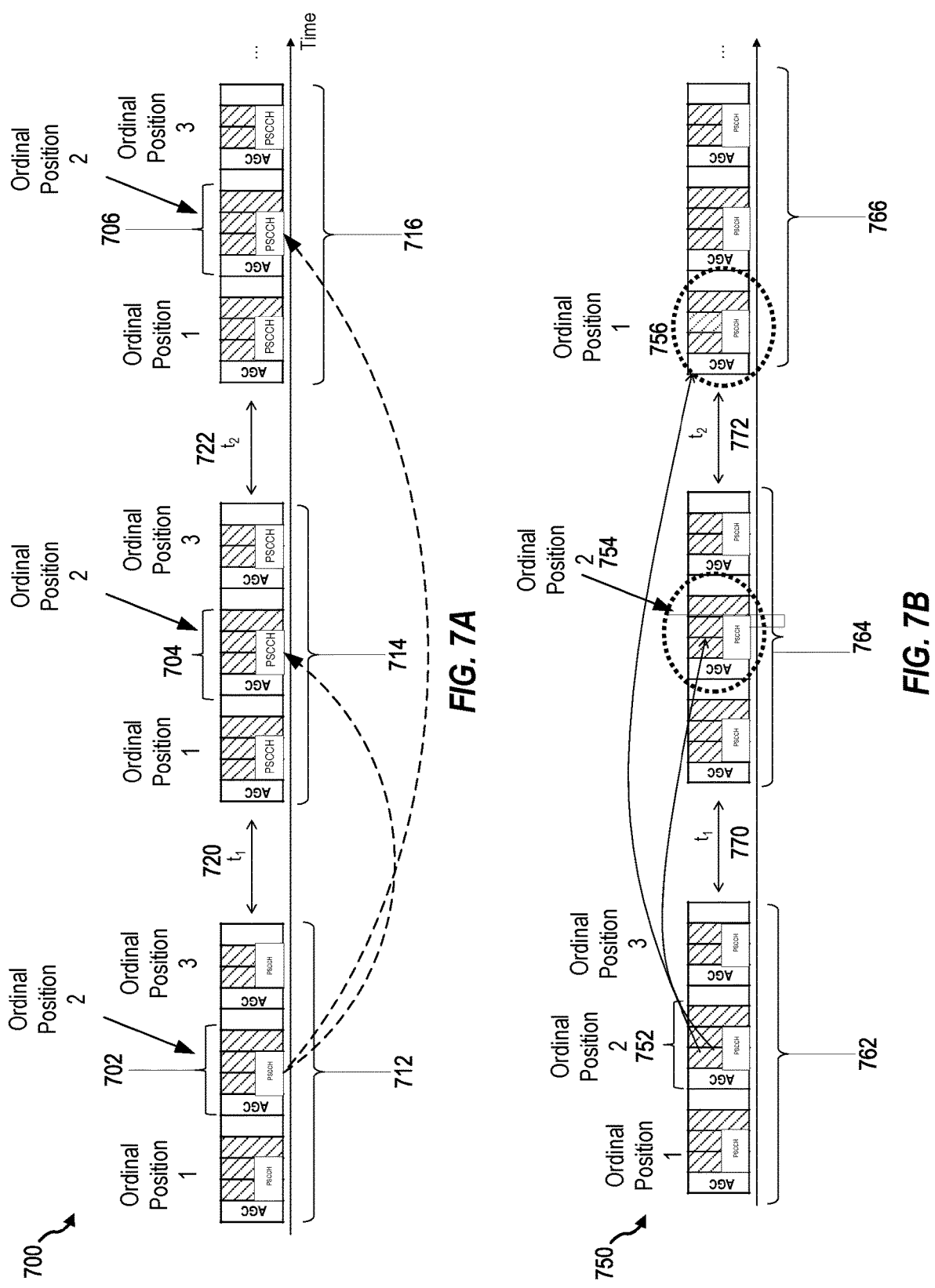
FIG. 7A depicts example sidelink mini-slot structures for sidelink communications in Mode 2, according to aspects of the present disclosure.
FIG. 7B depicts another example of sidelink mini-slot structures for sidelink communications in Mode 2, according to aspects of the present disclosure.

FIG. 7A and 7B depict example sidelink mini-slot structures for sidelink communications in Mode 2, according to aspects of the present disclosure.

In Mode 2 operation, a transmitting sidelink user equipment may reserve multiple future mini-slots using a resource reservation period (alternatively, a resource reservation interval). For example, the multiple future reserved mini-slots may be spaced apart by the amount of time indicated in the resource reservation interval. The slots containing the reserved mini-slots are separated by a time interval based on the resource reservation interval, for example, time interval t1 720 and time interval t2 722.

In some aspects, as depicted in FIG. 7A, reserved mini-slots will be located in the same ordinal position in their respective slots as where they are initially reserved. For example, if in the first slot 712 the second mini-slot 702 (of the three mini-slots) is used for reserving a future mini-slot in second slot 714, then the reservation in the second slot 714 will be located in the second mini-slot 704 (the same ordinal position, second of three, as in first slot 712). Similarly, if the reservation is for multiple future mini-slots, then the mini-slot reserved in the third slot 716 will be mini-slot 706, which is likewise in the same ordinal position (second of three mini-slots). In another aspect, as depicted in FIG. 7B, reserved mini-slots will not be located in the same ordinal position in their respective slots as where they are initially reserved. For example, in the first slot 762, the second mini-slot 752 (of the three mini-slots) is used for reserving a future mini-slot in the second slot 764 in second ordinal position 754, and in the third slot 766 in the first ordinal position 756.

An additional field may be used in SCI to indicate that a reservations is specifically for one or more future mini-slots (as opposed to future slots). For example, the additional SCI field may have a bit that can be set to indicate that mini-slots are being reserved as opposed to entire slots. For example, the SCI may comprise a first field to indicate a reservation is for one or more future mini-slots. The SCI may further comprise a second field to indicate a reservation for a plurality of future mini-slots, each future mini-slot of the plurality of future mini-slots being associated with a different future slot.

In some aspects, a SCI time resource assignment can be used to reserve mini-slots for a number of retransmissions (e.g., one or two retransmissions). The SCI time resource assignment will reserve mini-slots in the same ordinal place as the slots reserved the by the time resource assignment field. In some aspects, the reservation for a retransmission may be within a defined number of slots from the initial transmission, such as within 31 slots of the original transmission containing the time resource assignment.

Example Methods of Mini-slot Operation in Sidelink Communications

Figure 8:
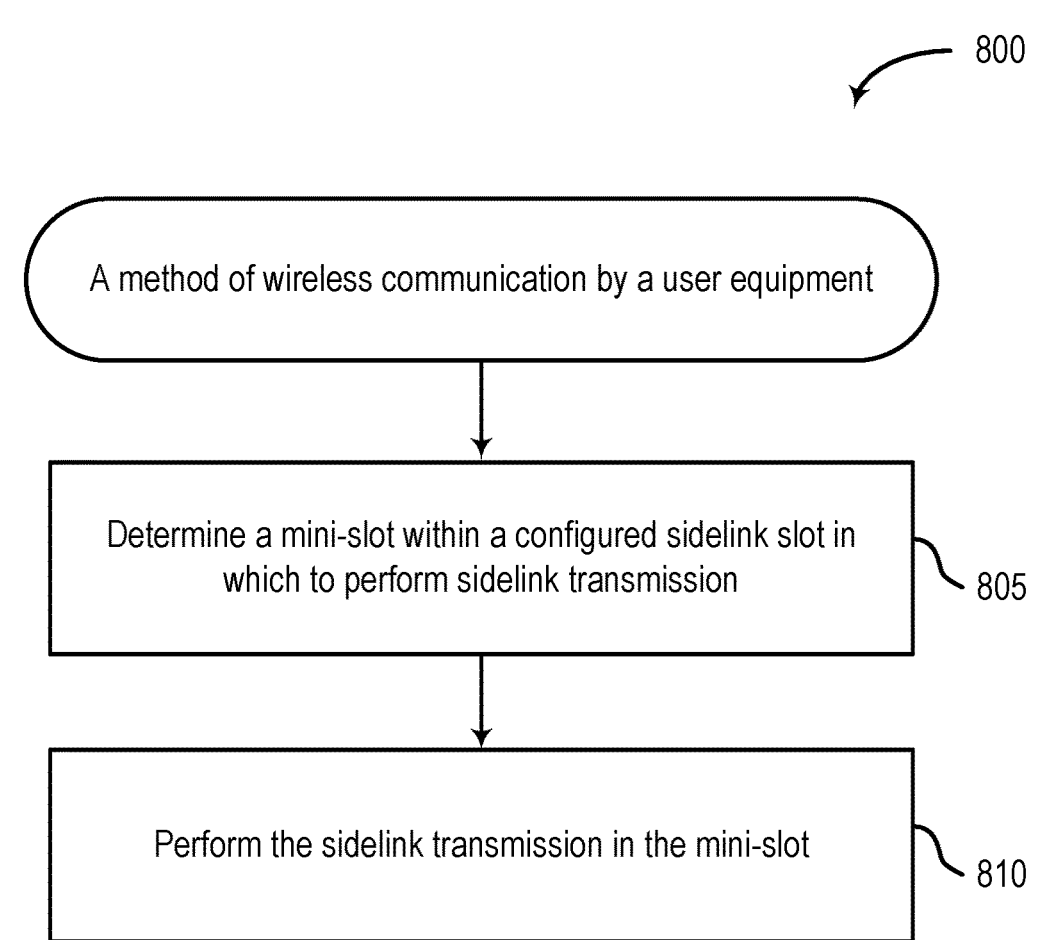
FIG. 8 depicts an example of a process for wireless communication according to aspects of the present disclosure.

FIG. 8 shows an example of a method 800 for wireless communication according to aspects of the present disclosure. In some aspects, a user equipment, such as UE 104 of FIGS. 1 and 2, or processing system 1005 of FIG. 10, may perform the method 1300.

Method 800 begins at step 805 with determining a mini-slot within a configured sidelink slot in which to perform sidelink transmission. In some cases, the operations of this step refer to, or may be performed by, sidelink resource circuitry as described with reference to FIG. 10.

Method 800 then proceeds to step 810 with performing the sidelink transmission in the mini-slot. In some cases, the operations of this step refer to, or may be performed by, sidelink transmission circuitry as described with reference to FIG. 10.

In some aspects, method 800 further includes receiving a sidelink transmission grant from a base station comprising a set of sidelink transmission configuration parameters, wherein the set of sidelink transmission configuration parameters defines a plurality of mini-slots within the configured sidelink slot. In some aspects, the set of sidelink transmission configuration parameters further comprises a mini-slot time resource assignment. In some aspects, determining the mini-slot within the configured sidelink slot based on the sidelink transmission grant comprises the user equipment choosing one or more mini-slots from the plurality of mini-slots defined in the set of sidelink transmission configuration parameters in which to perform the sidelink transmission. In some aspects, the set of sidelink transmission configuration parameters specifies one or more mini-slots of the plurality of mini-slots in which the user equipment may perform the sidelink transmission.

In some aspects, method 800 further includes transmitting sidelink control information (SCI) over a sidelink control channel, wherein the sidelink control information is configured to reserve a future mini-slot within a future sidelink slot, such as depicted and described with respect to FIGS. 7A and 7B.

In some aspects, the future mini-slot is located in a same ordinal place as the mini-slot. In some aspects, the sidelink control information comprises a first field to indicate a reservation is for one or more future mini-slots. In some aspects, the sidelink control information comprises a second field to indicate a reservation for a plurality of future mini-slots, each future mini-slot of the plurality of future mini-slots being associated with a different future slot.

In some aspects, the second field further indicates at least a first mini-slot of the plurality of future mini-slots with a first ordinal position in a first future slot and a second mini-slot of the plurality of future mini-slots with a second ordinal position in a second future slot.

FIG. 9 shows an example of a method 900 for wireless communication according to aspects of the present disclosure. In some aspects, a base station, such as BS 102 of FIGS. 1 and 2, or processing system 1105 of FIG. 11, may perform the method 900.

Method 900 begins at step 905 with transmitting a sidelink transmission grant to a user equipment including a set of sidelink transmission configuration parameters, where the set of sidelink transmission configuration parameters defines a set of mini-slots within a configured sidelink slot, for example, as depicted and described with respect to FIG. 6. In some cases, the operations of this step refer to, or may be performed by, sidelink transmission grant circuitry as described with reference to FIG. 11.

In some aspects, the set of sidelink transmission configuration parameters further comprises a mini-slot time resource assignment. In some aspects, the set of sidelink transmission configuration parameters specifies one or more mini-slots of the plurality of mini-slots in which the user equipment may perform sidelink transmission.

Example Wireless Communication Device

Figure 10:
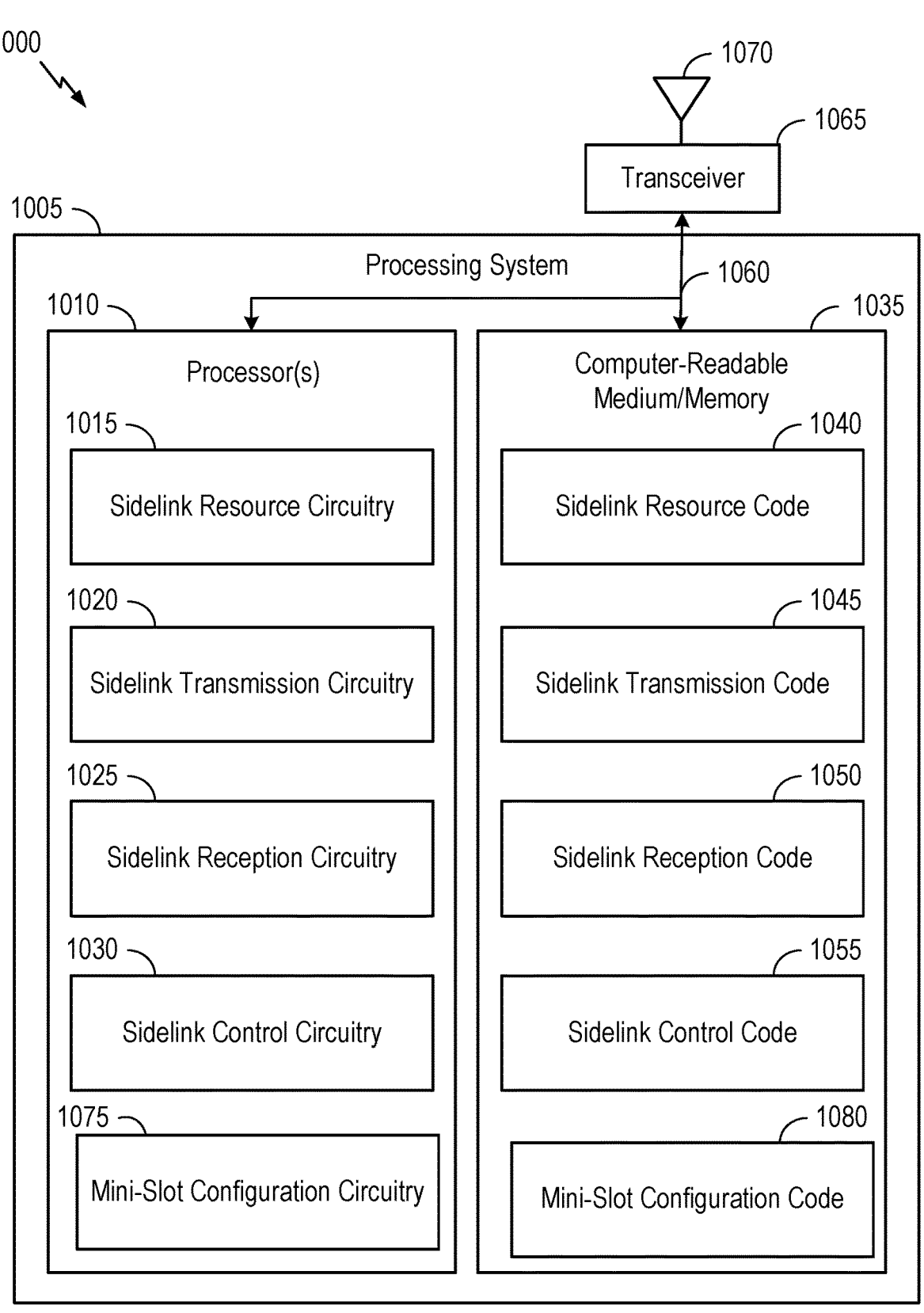
FIG. 10 depicts an example of a communications device according to aspects of the present disclosure.

FIG. 10 depicts an example communications device 1000 that includes various components operable, configured, or adapted to perform operations for the techniques disclosed herein, such as the operations depicted and described with respect to FIGS. 6-8. In some examples, communication device 1000 may be a UE 104 as described, for example with respect to FIGS. 1 and 2.

Communications device 1000 includes a processing system 1005 coupled to the transceiver 1065 (e.g., a transmitter and/or a receiver). The transceiver 1065 is configured to transmit (or send) and receive signals for the communications device 1000 via the antenna 1070, such as the various signals as described herein. The transceiver 1065 may communicate bi-directionally, via the antennas 1070, wired links, or wireless links as described herein. For example, the transceiver 1065 may represent a wireless transceiver and may communicate bi-directionally with another wireless transceiver. The transceiver 1065 may also include or be connected to a modem to modulate the packets and provide the modulated packets to for transmission, and to demodulate received packets. In some examples, the transceiver 1065 may be tuned to operate at specified frequencies. For example, a modem can configure the transceiver 1065 to operate at a specified frequency and power level based on the communication protocol used by the modem.

Processing system 1005 may be configured to perform processing functions for communications device 1000, including processing signals received and/or to be transmitted by communications device 1000. Processing system 1005 includes one or more processors 1010 coupled to a computer-readable medium/memory 1035 via a bus 1060.

In some examples, one or more processors 1010 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 1010 are configured to operate a memory array using a memory controller. In other cases, a memory controller is integrated into the one or more processors 1010. In some cases, the one or more processors 1010 are configured to execute computer-readable instructions stored in a memory to perform various functions. In some aspects, one or more processors 1010 include special purpose components for modem processing, baseband processing, digital signal processing, or transmission processing.

In certain aspects, computer-readable medium/memory 1035 is configured to store instructions (e.g., computer-executable code) that when executed by the one or more processors 1010, cause the one or more processors 1010 to perform the operations illustrated in FIG. 8, or other operations for performing the various techniques discussed herein.

In one aspect, computer-readable medium/memory 1035 includes sidelink resource code 1040, sidelink transmission code 1045, sidelink reception code 1050, sidelink control code 1055, and mini-slot configuration code 1080.

Examples of a computer-readable medium/memory 1035 include random access memory (RAM), read-only memory (ROM), solid state memory, a hard drive, a hard disk drive, etc. In some examples, computer-readable medium/memory 1035 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1000 may provide means for performing the methods described herein, including with respect to FIG. 8.

In some examples, means for transmitting or sending (or means for outputting for transmission) may include transceivers 254 and/or antenna(s) 252 of the UE 104 illustrated in FIG. 2 and/or the transceiver 1065 and the antenna 1070 of the communication device in FIG. 10.

In some examples, means for receiving (or means for obtaining) may include transceivers 254 and/or antenna(s) 252 of the UE 104 illustrated in FIG. 2 and/or the transceiver 1065 and the antenna 1070 of the communication device in FIG. 10.

In some examples, means for determining and means for performing may include various processing system 1005 components, such as: the one or more processors 1010 in FIG. 10, or aspects of the UE 104 depicted in FIG. 2, including receive processor 258, transmit processor 264, TX MIMO processor 266, and/or controller/processor 280 (including mini-slot configuration component 281).

In one aspect, one or more processors 1010 includes sidelink resource circuitry 1015, sidelink transmission circuitry 1020, sidelink reception circuitry 1025, sidelink control circuitry 1030, and mini-slot configuration circuitry 1075.

According to some aspects, sidelink resource circuitry 1015 determines a mini-slot within a configured sidelink slot in which to perform sidelink transmission.

According to some aspects, sidelink transmission circuitry 1020 performs the sidelink transmission in the mini-slot.

According to some aspects, sidelink reception circuitry 1025 receives a sidelink transmission grant from a base station including a set of sidelink transmission configuration parameters, where the set of sidelink transmission configuration parameters defines a set of mini-slots within the configured sidelink slot. In some aspects, the set of sidelink transmission configuration parameters further includes a mini-slot time resource assignment. In some aspects, determining the mini-slot within the configured sidelink slot based on the sidelink transmission grant includes the user equipment choosing one or more mini-slots from the set of mini-slots defined in the set of sidelink transmission configuration parameters in which to perform the sidelink transmission. In some aspects, the set of sidelink transmission configuration parameters specifies one or more mini-slots of the set of mini-slots in which the user equipment may perform the sidelink transmission.

According to some aspects, sidelink control circuitry 1030 transmits sidelink control information over a sidelink control channel, where the sidelink control information is configured to reserve a future mini-slot within a future sidelink slot. In some aspects, the future mini-slot is located in a same ordinal place as the mini-slot. In some aspects, the sidelink control information includes a first field to indicate a reservation is for one or more future mini-slots. In some aspects, the sidelink control information includes a second field to indicate a reservation for a set of future mini-slots, each future mini-slot of the set of future mini-slots being associated with a different future slot. In some aspects, the second field further indicates at least a first mini-slot of the set of future mini-slots with a first ordinal position in a first future slot and a second mini-slot of the set of future mini-slots with a second ordinal position in a second future slot.

According to some aspects, mini-slot configuration circuitry 1075 configures mini-slots for various network entities, including user equipments, such as user equipment 104 illustrated in FIG. 2.

Notably, FIG. 10 is just one example, and many other examples and configurations of communication device are possible.

Figure 11:
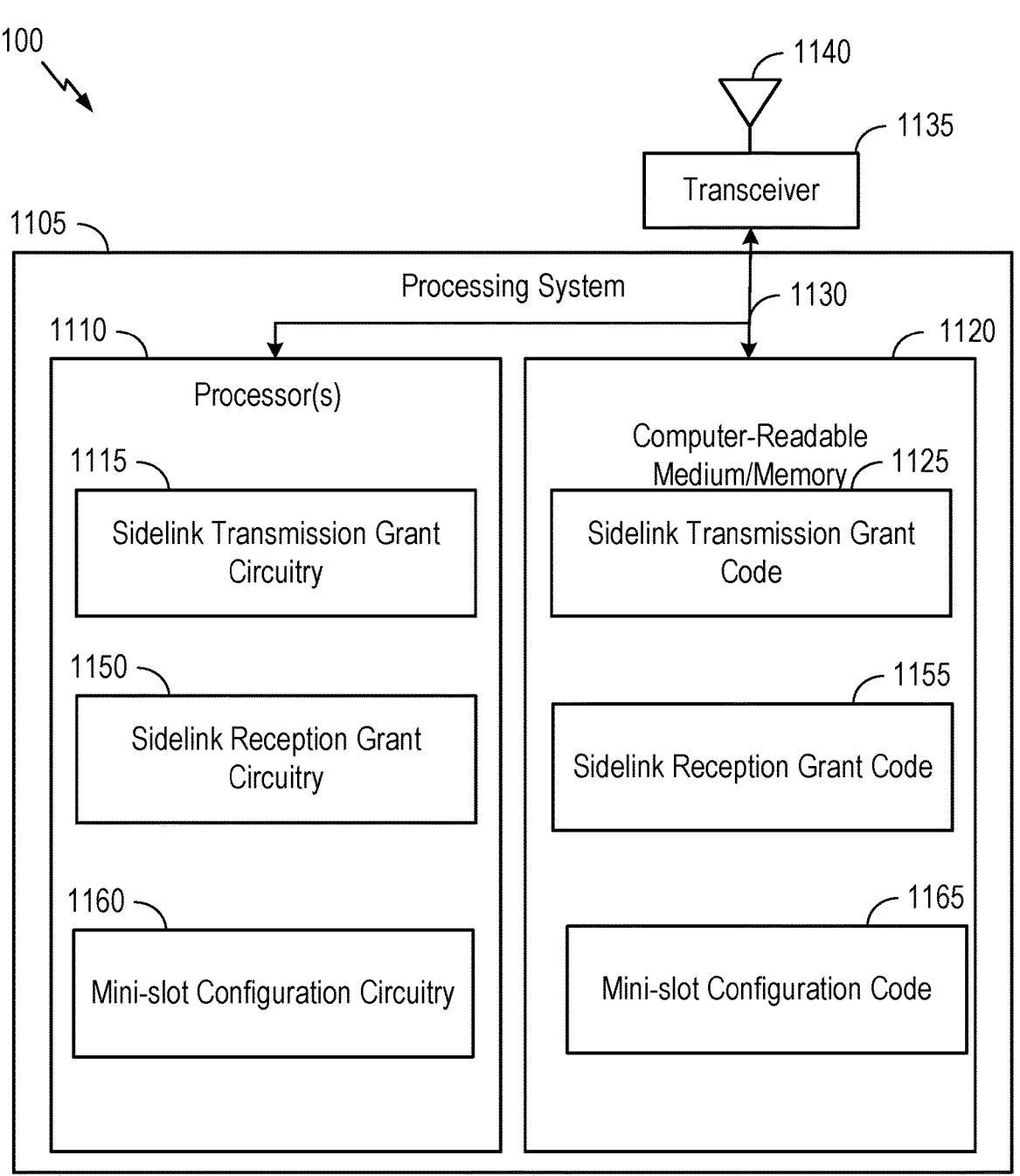
FIG. 11 depicts another example of another communications device according to aspects of the present disclosure.

FIG. 11 depicts an example communications device 1100 that includes various components operable, configured, or adapted to perform operations for the techniques disclosed herein, such as the operations depicted and described with respect to FIGS. 6 and 9. In some examples, communication device may be a BS 102 as described, for example with respect to FIGS. 1 and 2.

Communications device 1100 includes a processing system 1105 coupled to the transceiver 1135 (e.g., a transmitter and/or a receiver). The transceiver 1135 is configured to transmit (or send) and receive signals for the communications device 1100 via the antenna 1140, such as the various signals as described herein. The transceiver 1135 may communicate bi-directionally, via the antennas 1140, wired links, or wireless links as described herein. For example, the transceiver 1135 may represent a wireless transceiver and may communicate bi-directionally with another wireless transceiver. The transceiver 1135 may also include or be connected to a modem to modulate the packets and provide the modulated packets to for transmission, and to demodulate received packets. In some examples, the transceiver 1135 may be tuned to operate at specified frequencies. For example, a modem can configure the transceiver 1135 to operate at a specified frequency and power level based on the communication protocol used by the modem.

Processing system 1105 may be configured to perform processing functions for communications device 1100, including processing signals received and/or to be transmitted by communications device 1100. Processing system 1105 includes one or more processors 1110 coupled to a computer-readable medium/memory 1120 via a bus 1130.

In some examples, one or more processors 1110 may include one or more intelligent hardware devices, (e.g., a general-purpose processing component, a DSP, a CPU, a GPU, a microcontroller, an ASIC, a FPGA, a programmable logic device, a discrete gate or transistor logic component, a discrete hardware component, or any combination thereof). In some cases, the one or more processors 1110 are configured to operate a memory array using a memory controller. In other cases, a memory controller is integrated into the one or more processors 1110. In some cases, the one or more processors 1110 are configured to execute computer-readable instructions stored in a memory to perform various functions. In some aspects, one or more processors 1110 include special purpose components for modem processing, baseband processing, digital signal processing, or transmission processing.

In certain aspects, computer-readable medium/memory 1120 is configured to store instructions (e.g., computer-executable code) that when executed by the one or more processors 1110, cause the one or more processors 1110 to perform the operations illustrated in FIG. 9, or other operations for performing the various techniques discussed herein.

In one aspect, computer-readable medium/memory 1120 includes sidelink transmission grant code 1125, sidelink reception grant code 1155, and mini-slot configuration code 1165.

Examples of a computer-readable medium/memory 1120 include RAM, ROM, solid state memory, a hard drive, a hard disk drive, etc. In some examples, computer-readable medium/memory 1120 is used to store computer-readable, computer-executable software including instructions that, when executed, cause a processor to perform various functions described herein. In some cases, the memory contains, among other things, a BIOS which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 1100 may provide means for performing the methods described herein, including with respect to FIG. 9.

In some examples, means for transmitting or sending (or means for outputting for transmission) may include transceivers 232 and/or antenna(s) 234 of the BS 102 illustrated in FIG. 2 and/or the transceiver 1135 and the antenna 1140 of the communication device in FIG. 11.

In some examples, means for receiving (or means for obtaining) may include transceivers 232 and/or antenna(s) 234 of the BS 102 illustrated in FIG. 2 and/or the transceiver 1135 and the antenna 1140 of the communication device in FIG. 11.

In some examples, means for transmitting may include various processing system 1105 components, such as: the one or more processors 1110 in FIG. 11, or aspects of the BS 102 depicted in FIG. 2, including receive processor 238, transmit processor 220, TX MIMO processor 230, and/or controller/processor 240 (including mini-slot configuration component 241).

In one aspect, one or more processors 1110 includes sidelink transmission grant circuitry 1115, sidelink reception grant circuitry 1150, and mini-slot configuration circuitry 1160.

According to some aspects, sidelink transmission grant circuitry 1115 transmits a sidelink transmission grant to a user equipment including a set of sidelink transmission configuration parameters, where the set of sidelink transmission configuration parameters defines a set of mini-slots within a configured sidelink slot. In some aspects, the set of sidelink transmission configuration parameters further includes a mini-slot time resource assignment. In some aspects, the set of sidelink transmission configuration parameters specifies one or more mini-slots of the set of mini-slots in which the user equipment may perform sidelink transmission.

According to some aspects, sidelink reception grant circuitry 1150 receives a sidelink transmission grant at a user equipment including a set of sidelink transmission configuration parameters, where the set of sidelink transmission configuration parameters defines a set of mini-slots within a configured sidelink slot.

According to some aspects, mini-slot configuration circuitry 1075 configures mini-slots for various network entities, including user equipments, such as user equipment 104 illustrated in FIG. 2.

Notably, FIG. 11 is just one example, and many other examples and configurations of communication device are possible.

Example Clauses

Implementation examples are described in the following numbered clauses:

Clause 1: A method of wireless communication by a user equipment, the method comprising: determining a mini-slot within a configured sidelink slot in which to perform sidelink transmission; and performing the sidelink transmission in the mini-slot.

Clause 2: The method of Clause 1, further comprising: receiving a sidelink transmission grant from a base station comprising a set of sidelink transmission configuration parameters, wherein the set of sidelink transmission configuration parameters defines a plurality of mini-slots within the configured sidelink slot.

Clause 3: The method of Clause 2, wherein the set of sidelink transmission configuration parameters further comprises a mini-slot time resource assignment.

Clause 4: The method of Clause 2, wherein determining the mini-slot within the configured sidelink slot based on the sidelink transmission grant comprises the user equipment choosing one or more mini-slots from the plurality of mini-slots defined in the set of sidelink transmission configuration parameters in which to perform the sidelink transmission.

Clause 5: The method of Clause 2, wherein the set of sidelink transmission configuration parameters specifies one or more mini-slots of the plurality of mini-slots in which the user equipment may perform the sidelink transmission.

Clause 6: The method of any one of Clauses 1-5, further comprising: transmitting sidelink control information over a sidelink control channel, wherein the sidelink control information is configured to reserve a future mini-slot within a future sidelink slot.

Clause 7: The method of Clause 6, wherein the future mini-slot is located in a same ordinal place as the mini-slot.

Clause 8: The method of Clause 6, wherein the sidelink control information comprises a first field to indicate a reservation is for one or more future mini-slots.

Clause 9: The method of Clause 8, wherein: the sidelink control information comprises a second field to indicate a reservation for a plurality of future mini-slots, each future mini-slot of the plurality of future mini-slots being associated with a different future slot; and the second field further indicates at least a first mini-slot of the plurality of future mini-slots with a first ordinal position in a first future slot and a second mini-slot of the plurality of future mini-slots with a second ordinal position in a second future slot.

Clause 10: A method of wireless communication by a base station, the method comprising: transmitting a sidelink transmission grant to a user equipment comprising a set of sidelink transmission configuration parameters, wherein the set of sidelink transmission configuration parameters defines a plurality of mini-slots within a configured sidelink slot.

Clause 11: The method of Clause 10, wherein the set of sidelink transmission configuration parameters further comprises a mini-slot time resource assignment.

Clause 12: The method of any one of Clauses 10 and 11, wherein the set of sidelink transmission configuration parameters specifies one or more mini-slots of the plurality of mini-slots in which the user equipment may perform sidelink transmission.

Clause 13: A processing system, comprising: a memory comprising computer-executable instructions; one or more processors configured to execute the computer-executable instructions and cause the processing system to perform a method in accordance with any one of Clauses 1-12.

Clause 14: A processing system, comprising means for performing a method in accordance with any one of Clauses 1-12.

Clause 15: A non-transitory computer-readable medium comprising computer-executable instructions that, when executed by one or more processors of a processing system, cause the processing system to perform a method in accordance with any one of Clauses 1-12.

Clause 16: A computer program product embodied on a computer-readable storage medium comprising code for performing a method in accordance with any one of Clauses 1-12.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an 51 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as BS 180 (e.g., gNB) may operate in a traditional sub-6 GHz spectrum, in millimeter wave (mmWave) frequencies, and/or near mmWave frequencies in communication with the UE 104. When the BS 180 operates in mmWave or near mmWave frequencies, the BS 180 may be referred to as an mmWave base station.

The communication links 120 between BSs 102 and, for example, UEs 104, may be through one or more carriers. For example, BSs 102 and UEs 104 may use spectrum up to YMHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communication network 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a PSSCH, and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a PSSCH.

Transmit processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH DMRS, and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a RB, may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A, 3B, 3C, and 3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through RRC signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2 μ slots/subframe. The subcarrier spacing and symbol length/duration are a function of the numerology. The subcarrier spacing may be equal to $2^{\mu} \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A, 3B, 3C, and 3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a RB (also referred to as physical RBs (PRBs)) that extends 12 consecutive subcarriers. The resource grid is divided into multiple REs. The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI- RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of mini-slot operation in sidelink communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user equipment (as in the example UE 104 of FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module.

Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication by a user equipment, the method comprising:
    performing channel sensing in a configured sidelink slot comprising a plurality of mini-slots;

choosing, based on the channel sensing, a mini-slot from the plurality of mini-slots in which to perform sidelink transmission; and performing the sidelink transmission in the mini-slot, wherein the method further comprises transmitting sidelink control information over a sidelink control channel, wherein:

the sidelink control information is configured to reserve one or more future mini-slots within one or more future sidelink slots;

the sidelink control information comprises a first field to indicate the reservation is for mini-slots;

the sidelink control information comprises a second field to indicate a reservation for a plurality of future mini-slots, each future mini-slot of the plurality of future mini-slots being associated with a different future slot; and the second field further indicates at least a first mini-slot of the plurality of future mini-slots with a first ordinal position in a first future slot and a second mini-slot of the plurality of future mini-slots with a second ordinal position in a second future slot.

2. The method of claim 1, further comprising:

receiving a sidelink transmission grant from a base station, the sidelink transmission grant comprising a set of sidelink transmission configuration parameters, wherein the set of sidelink transmission configuration parameters defines the plurality of mini-slots within the configured sidelink slot.

3. The method of claim 2, wherein the set of sidelink transmission configuration parameters further comprises a mini-slot time resource assignment.

4. The method of claim 2, wherein the set of sidelink transmission configuration parameters specifies one or more mini-slots of the plurality of mini-slots in which the user equipment may perform the sidelink transmission.

5. A user equipment configured for wireless communication, the user equipment comprising at least one memory coupled to one or more processors, wherein the one or more processors are configured to cause the user equipment to:

perform channel sensing in a configured sidelink slot comprising a plurality of mini-slots;

choose, based on the channel sensing, a mini-slot from the plurality of mini-slots in which to perform sidelink transmission; and perform the sidelink transmission in the mini-slot, wherein the one or more processors are further configured to cause the user equipment to transmit sidelink control information over a sidelink control channel, wherein:

the sidelink control information is configured to reserve one or more future mini-slots within one or more future sidelink slots;

the sidelink control information comprises a first field to indicate the reservation is for mini-slots;

the sidelink control information comprises a second field to indicate a reservation for a plurality of future mini-slots, each future mini-slot of the plurality of future mini-slots being associated with a different future slot; and the second field further indicates at least a first mini-slot of the plurality of future mini-slots with a first ordinal position in a first future slot and a second mini-slot of the plurality of future mini-slots with a second ordinal position in a second future slot.

6. The user equipment of claim 5, wherein the one or more processors are configured to further cause the user equipment to:

receive a sidelink transmission grant from a base station, the sidelink transmission grant comprising a set of sidelink transmission configuration parameters, wherein the set of sidelink transmission configuration parameters defines the plurality of mini-slots within the configured sidelink slot.

7. The user equipment of claim 6, wherein the set of sidelink transmission configuration parameters further comprises a mini-slot time resource assignment.

8. The user equipment of claim 6, wherein the set of sidelink transmission configuration parameters specifies one or more mini-slots of the plurality of mini-slots in which the user equipment may perform the sidelink transmission.

9. A non-transitory computer-readable medium comprising computer-executable instructions that, when executed by one or more processors of a user equipment, cause the user equipment to perform a method of wireless communication, the method comprising:

performing channel sensing in a configured sidelink slot comprising a plurality of mini-slots;

choosing, based on the channel sensing, a mini-slot from the plurality of mini-slots in which to perform sidelink transmission; and performing the sidelink transmission in the mini-slot, wherein the method further comprises transmitting sidelink control information over a sidelink control channel, wherein:

the sidelink control information is configured to reserve one or more future mini-slots within one or more future sidelink slots;

the sidelink control information comprises a first field to indicate the reservation is for mini-slots;

the sidelink control information comprises a second field to indicate a reservation for a plurality of future mini-slots, each future mini-slot of the plurality of future mini-slots being associated with a different future slot; and the second field further indicates at least a first mini-slot of the plurality of future mini-slots with a first ordinal position in a first future slot and a second mini-slot of the plurality of future mini-slots with a second ordinal position in a second future slot.

10. The non-transitory computer-readable medium of claim 9, wherein the method further comprises:

receiving a sidelink transmission grant from a base station, the sidelink transmission grant comprising a set of sidelink transmission configuration parameters, wherein the set of sidelink transmission configuration parameters defines the plurality of mini-slots within the configured sidelink slot.

11. The non-transitory computer-readable medium of claim 10, wherein the set of sidelink transmission configuration parameters further comprises a mini-slot time resource assignment.

12. The non-transitory computer-readable medium of claim 10, wherein the set of sidelink transmission configuration parameters specifies one or more mini-slots of the plurality of mini-slots in which the user equipment may perform the sidelink transmission.

13. An apparatus configured for wireless communication, the apparatus comprising:

means for performing channel sensing in a configured sidelink slot comprising a plurality of mini-slots;

means for choosing, based on the channel sensing, a mini-slot from the plurality of mini-slots in which to perform sidelink transmission; and means for performing the sidelink transmission in the mini-slot, wherein the apparatus further comprises means for transmitting sidelink control information over a sidelink control channel, wherein:

the sidelink control information is configured to reserve one or more future mini-slots within one or more future sidelink slots;

the sidelink control information comprises a first field to indicate the reservation is for mini-slots;

the sidelink control information comprises a second field to indicate a reservation for a plurality of future mini-slots, each future mini-slot of the plurality of future mini-slots being associated with a different future slot; and the second field further indicates at least a first mini-slot of the plurality of future mini-slots with a first ordinal position in a first future slot and a second mini-slot of the plurality of future mini-slots with a second ordinal position in a second future slot.

14. The apparatus of claim 13, further comprising:

means for receiving a sidelink transmission grant from a base station, the sidelink transmission grant comprising a set of sidelink transmission configuration parameters, wherein the set of sidelink transmission configuration parameters defines the plurality of mini-slots within the configured sidelink slot.

15. The apparatus of claim 14, wherein the set of sidelink transmission configuration parameters further comprises a mini-slot time resource assignment.

16. The apparatus of claim 14, wherein the set of sidelink transmission configuration parameters specifies one or more mini-slots of the plurality of mini-slots in which the user equipment may perform the sidelink transmission.

* * * * *